(12) United States Patent
Akan et al.

(10) Patent No.: US 9,816,748 B2
(45) Date of Patent: Nov. 14, 2017

(54) REFRIGERATOR COMPRISING AN ICE CREAM MAKING DEVICE

(71) Applicant: ARCELIK ANONIM SIRKETI, Istanbul (TR)

(72) Inventors: Samet Akan, Istanbul (TR); Sunay Mutlu, Istanbul (TR); Urfet Demirkan, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 117 days.

(21) Appl. No.: 14/904,424

(22) PCT Filed: Jun. 27, 2014

(86) PCT No.: PCT/EP2014/063636
§ 371 (c)(1),
(2) Date: Jan. 11, 2016

(87) PCT Pub. No.: WO2015/003923
PCT Pub. Date: Jan. 15, 2015

(65) Prior Publication Data
US 2016/0201978 A1    Jul. 14, 2016

(30) Foreign Application Priority Data
Jul. 10, 2013   (TR) .............. A 2013/08317

(51) Int. Cl.
*F25D 23/12*   (2006.01)
*A23G 9/22*   (2006.01)
(Continued)

(52) U.S. Cl.
CPC ............... *F25D 23/12* (2013.01); *A23G 9/12* (2013.01); *A23G 9/22* (2013.01); *F25D 11/02* (2013.01)

(58) Field of Classification Search
CPC   F25D 23/12; F25D 11/02; A23G 9/22; A23G 9/12
See application file for complete search history.

(56) References Cited

U.S. PATENT DOCUMENTS 4,450,692 A * 5/1984 Sharpe ...................... A23G 9/12
62/233
4,551,026 A * 11/1985 Cristante .................. A23G 9/04
366/149
(Continued)

OTHER PUBLICATIONS

International search report for PCT application No. PCT/EP2014/058636 and references contained therein are considered to be closest material prior art and any additional references cited in the application merely define the general state of the art and/or are duplicative.

(Continued)

*Primary Examiner* — Emmanuel Duke
(74) *Attorney, Agent, or Firm* — Kilpatrick Townsend & Stockton LLP

(57) ABSTRACT

The present invention relates to a refrigerator (1) comprising a fresh food compartment (2) wherein foodstuffs to be cooled are placed, a freezing compartment (3) wherein foodstuffs to be frozen are placed, and an ice cream making device (4) that is placed into the freezing compartment (3) and that has a cabinet (5), a receptacle (6) disposed inside the cabinet (5) and wherein ice cream is prepared, a mixer (7) situated in the receptacle (6), a motor (8) that actuates and rotates the mixer (7) and a transmission means (9).

20 Claims, 8 Drawing Sheets

Figure 1:
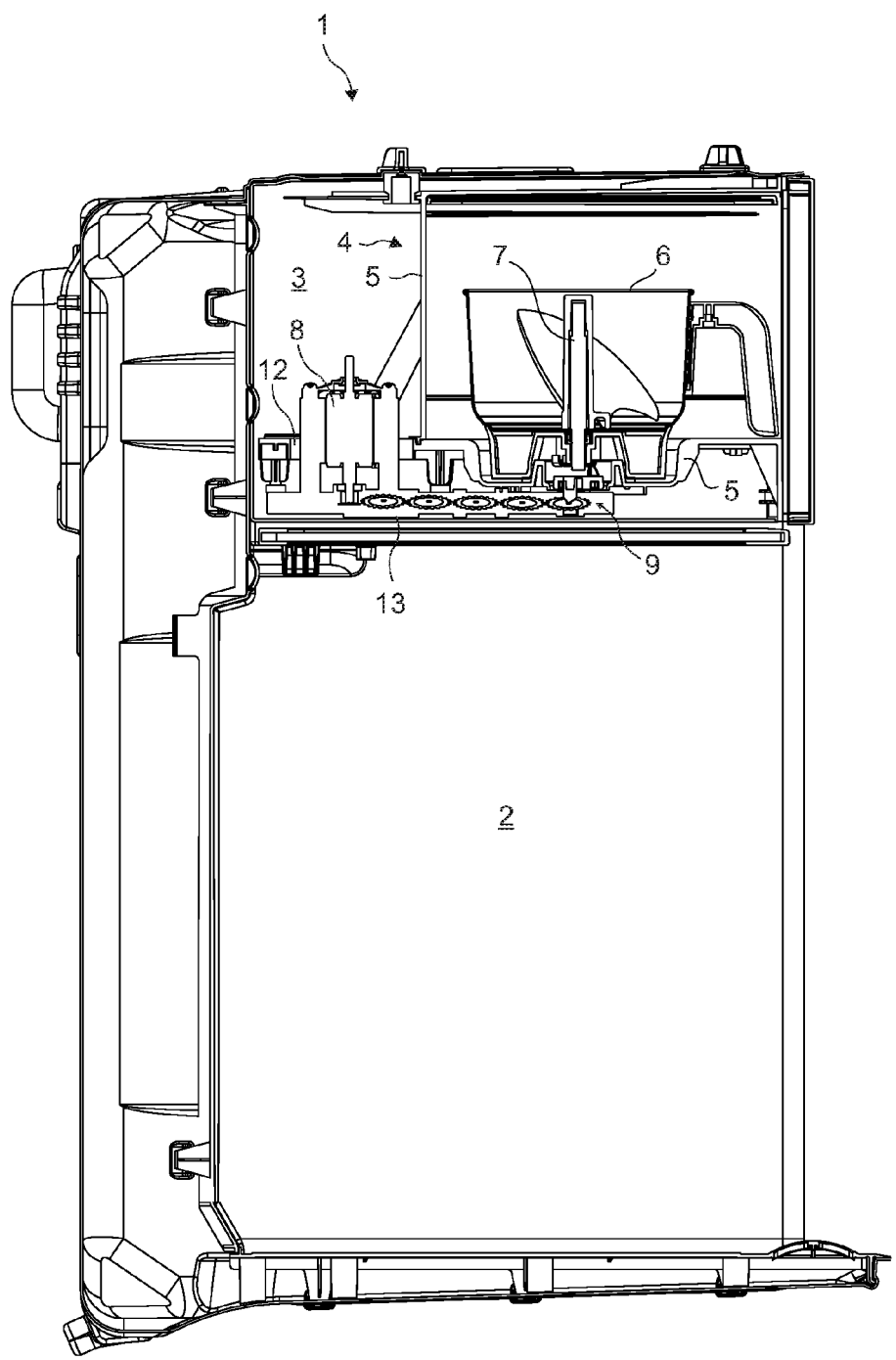

(51) Int. Cl.
*F25D 11/02* (2006.01)
*A23G 9/12* (2006.01)

(56) References Cited

U.S. PATENT DOCUMENTS

| | | | | |
|---|---|---|---|---|
| 4,736,600 A * | 4/1988 | Brown | .................... | A23G 9/12 |
| | | | | 222/146.6 |
| 4,802,407 A * | 2/1989 | Negri | .................... | A01J 25/001 |
| | | | | 366/145 |
| 5,106,199 A * | 4/1992 | Eckel | .................... | A23G 9/12 |
| | | | | 366/147 |
| 6,267,049 B1 * | 7/2001 | Silvano | .................... | A23G 9/12 |
| | | | | 366/144 |

OTHER PUBLICATIONS

Written opinion of the international searching authority for PCT application No. PCT/EP2014/058636and references contained therein are considered to be closest material prior art and any additional references cited in the application merely define the general state of the art and/or are duplicative.

* cited by examiner

REFRIGERATOR COMPRISING AN ICE CREAM MAKING DEVICE

The present invention relates to a refrigerator comprising an ice cream making device which enables the making of ice cream.

Refrigerators comprise a fresh food compartment wherein foods and beverages are stored, a freezing compartment that enables foods to be stored by being frozen, and an ice cream making device that is disposed in the freezing compartment and that enables the user to make ice cream inside the refrigerator. The position of the ice cream making device gains importance not only for easy producibility and assembly but also for providing ease of utilization. A considerably detailed and high cost design alteration is required in the freezing compartment of the refrigerator in order to adapt the ice cream making device to the refrigerator. Moreover, the motor may malfunction if the ingredients reach the motor as a result of accidental spilling of liquids or overflowing of the ingredients from the receptacle while ice cream is being made in the receptacle. In the state of the art, the mixer apparatus enabling the ingredients of ice cream to be mixed, the motor and the actuation mechanisms that rotate the mixer apparatus are located at the upper side of the receptacle wherein ice cream is made. The said motor and actuation mechanisms occupy too much space in the freezing compartment and the number of parts and cost of the system increase.

In the state of the art Great Britain Patent Application No. GB707085A, an electrically driven ice-cream mixer is disclosed, which is arranged within a separate cabinet inside the refrigerating compartment.

In the state of the art Japanese Patent Application No. JP2008142017A, an ice cream maker is described, which is situated inside the freezing compartment of the refrigerator and the energy consumption of which is decreased.

The aim of the present invention is the realization of a refrigerator comprising an ice cream making device which enables the user to make ice cream in a practical manner.

Another aim of the present invention is the realization of an ice cream making device which provides convenience in production, assembly and serviceability.

Another aim of the present invention is to prevent the motor from malfunctioning.

The refrigerator realized in order to attain the aim of the present invention, explicated in the first claim and the respective claims thereof, comprises an ice cream making device that can be mounted to/dismounted from the freezing compartment as a single unit together with the motor and the transmission means and that has a receptacle, a mixer and an outer cabinet, enabling foodstuffs to be stored inside the cabinet. The refrigerator of the present invention furthermore comprises a bottom wall that forms the base of the cabinet, a housing that is situated on the bottom wall and whereon the receptacle is placed, an extension that extends from the bottom wall towards the outside of the cabinet and that supports the motor, a casing that supports the motor and the transmission means and a sealing element that extends between the bottom wall and the casing and that remains between the housing and the motor.

In an embodiment of the present invention, the refrigerator comprises the sealing element that extends outwards from over the casing along the width of the casing so as to face the motor. The casing is preferably quadrilateral.

In an embodiment of the present invention, the sealing element comprises an extension that extends from over the casing and an assembly housing that extends from the bottom wall and wherein the extension is seated.

In an embodiment of the present invention, the refrigerator comprises the plate-shaped sealing element that is situated on the housing and that extends downwards from the housing in a direction opposite to the region where the motor is situated.

In an embodiment of the present invention, the refrigerator comprises the sealing element that is situated on the casing, that extends upwards from the casing and that bears against the bottom wall when the casing and the cabinet are mounted.

In an embodiment of the present invention, the refrigerator comprises the sealing element that is situated on the casing, that extends upwards from the casing, that contacts the bottom wall when the casing and the cabinet are mounted and the height of which decreases from the side thereof close to the motor to the side thereof close to the housing.

In an embodiment of the present invention, the sealing element is produced from a liquid absorbing material.

By means of the present invention, a refrigerator is realized, that comprises an ice cream making device that can be easily installed, that enables the user to produce ice cream in a practical manner, that prevents a probable motor malfunction and wherein foodstuffs can be stored as well.

A refrigerator realized in order to attain the aim of the present invention is illustrated in the attached figures, where:

FIG. 1—is the sideways schematic view of a refrigerator wherein the ice cream making device is placed into the freezing compartment.

Figure 2:
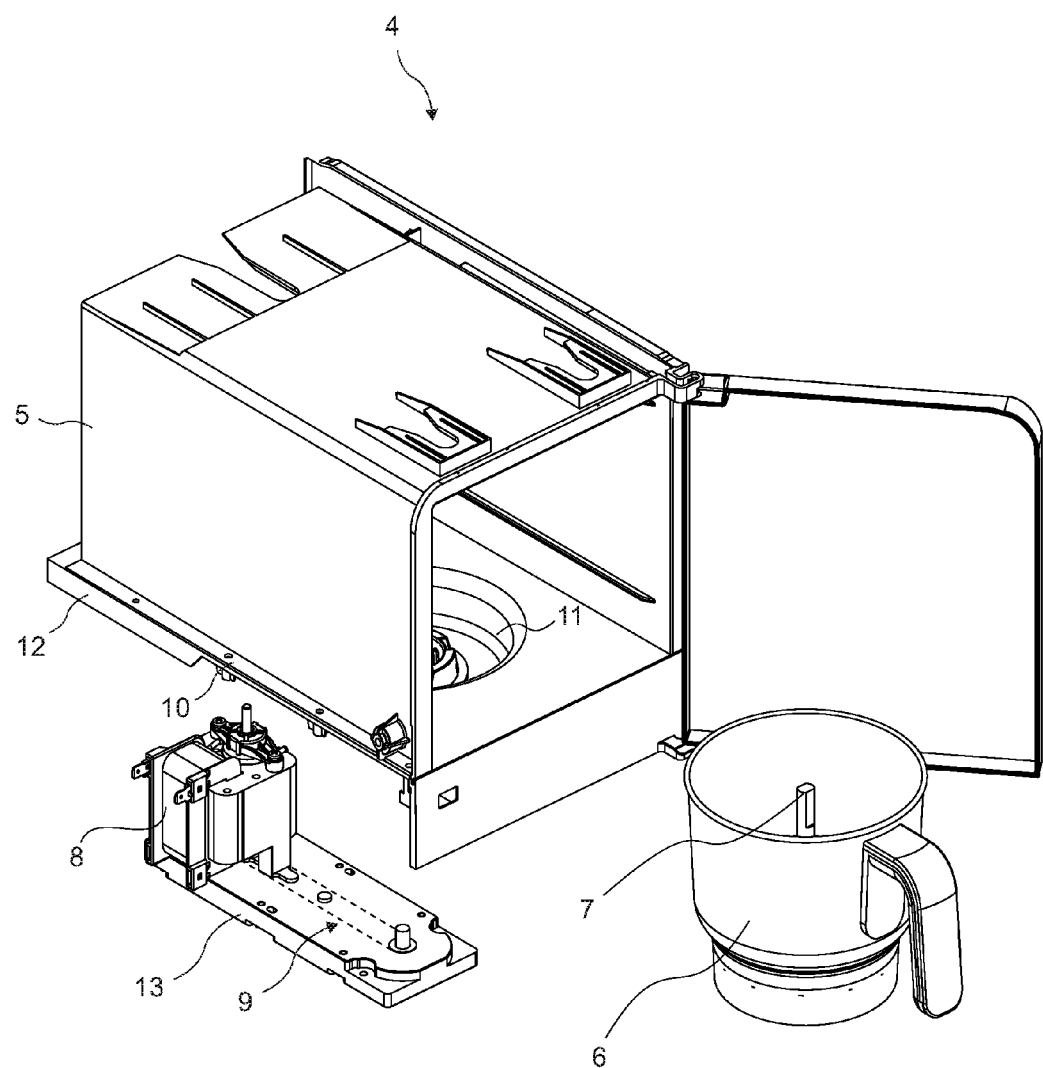

FIG. 2—is the perspective view of the ice cream making device cabinet, the receptacle and the casing that supports the motor and the transmission means.

Figure 3:
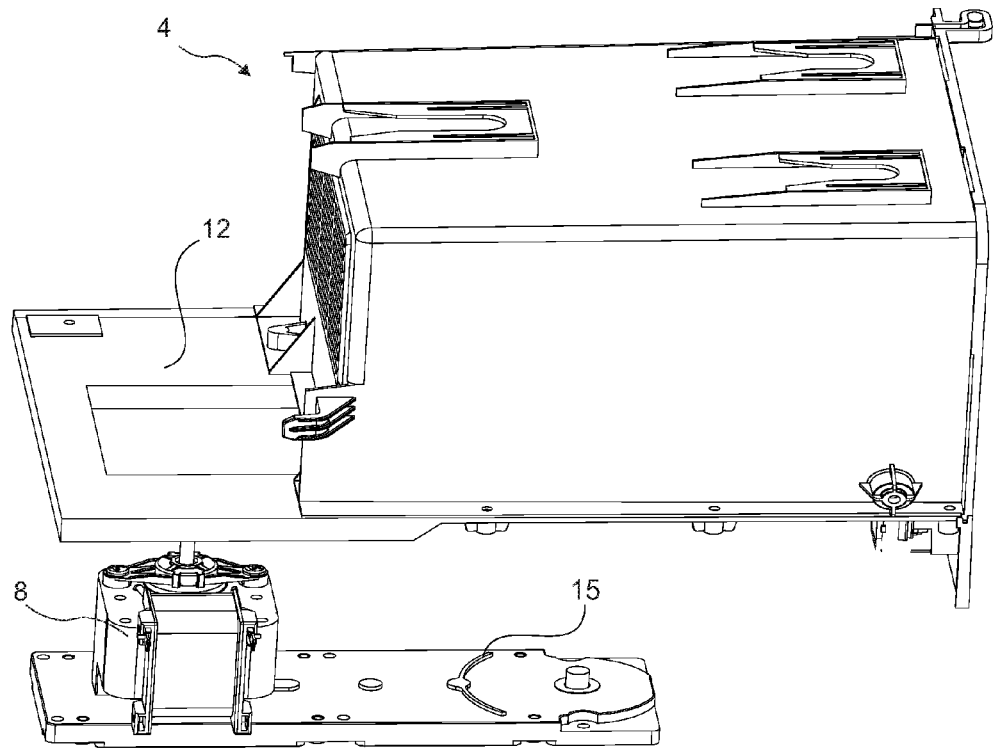

FIG. 3—is the sideways perspective view of the cabinet and the casing in an embodiment of the present invention.

Figure 4:
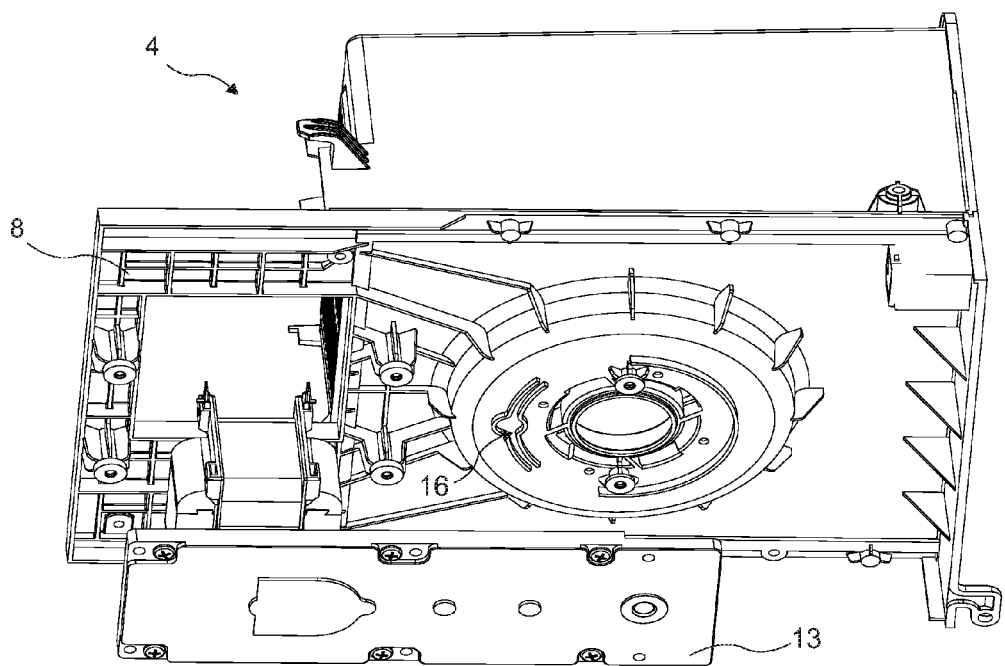

FIG. 4—is the bottom perspective view of the cabinet and the casing in an embodiment of the present invention.

Figure 5:
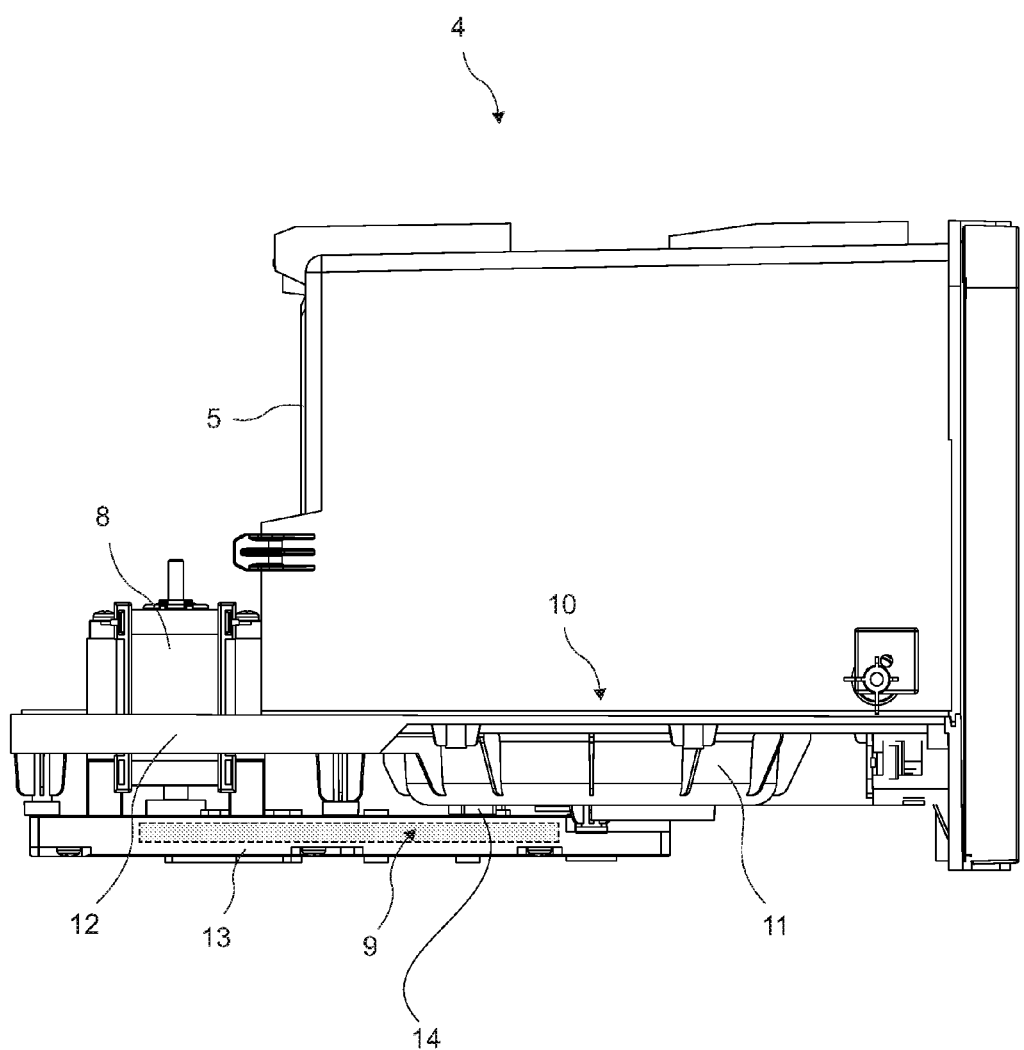

FIG. 5—is the sideways view of the ice cream making device.

Figure 6:
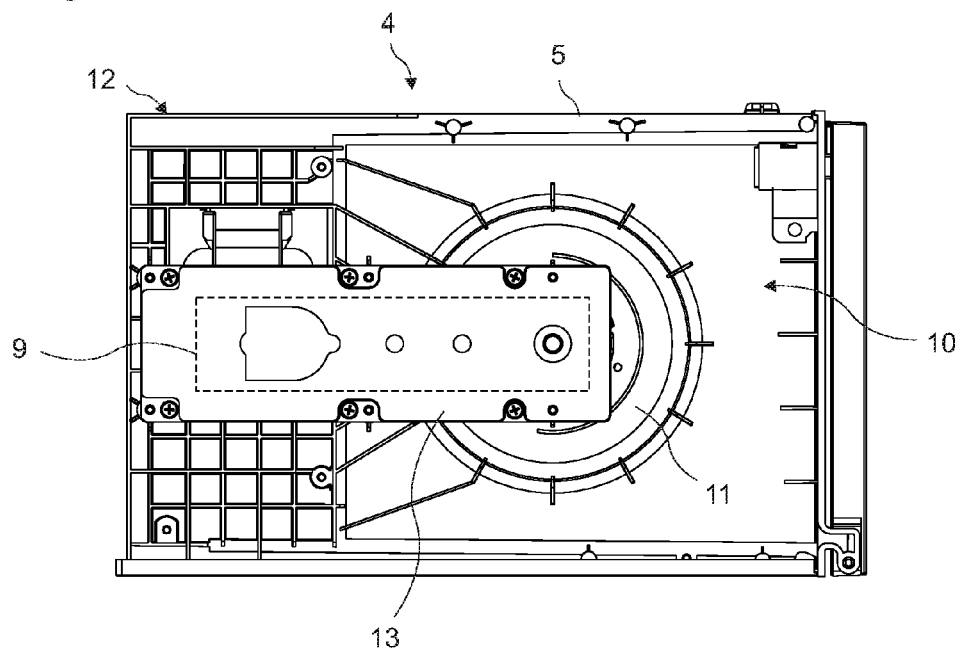

FIG. 6—is the bottom view of the ice cream making device.

Figure 7:
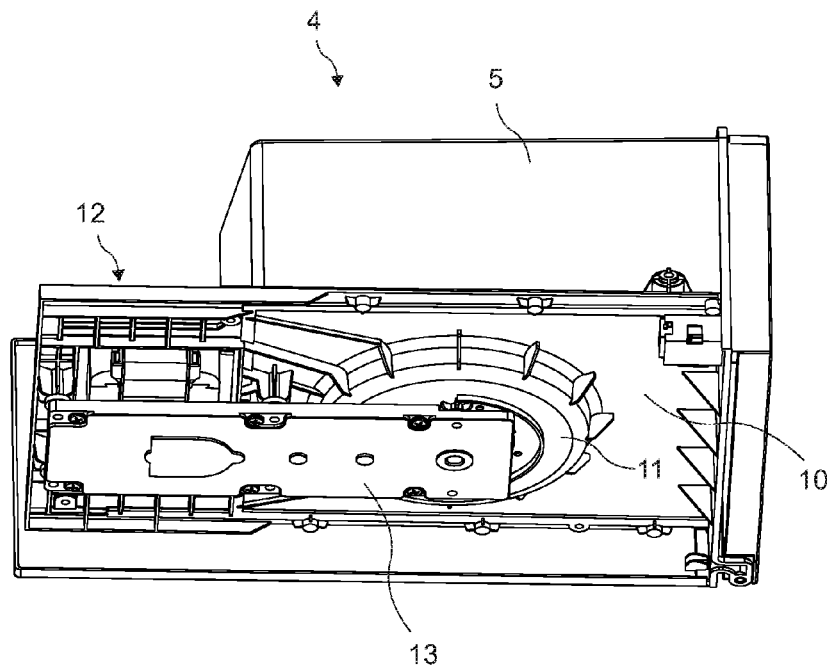

FIG. 7—is the bottom perspective view of the ice cream making device.

Figure 8:
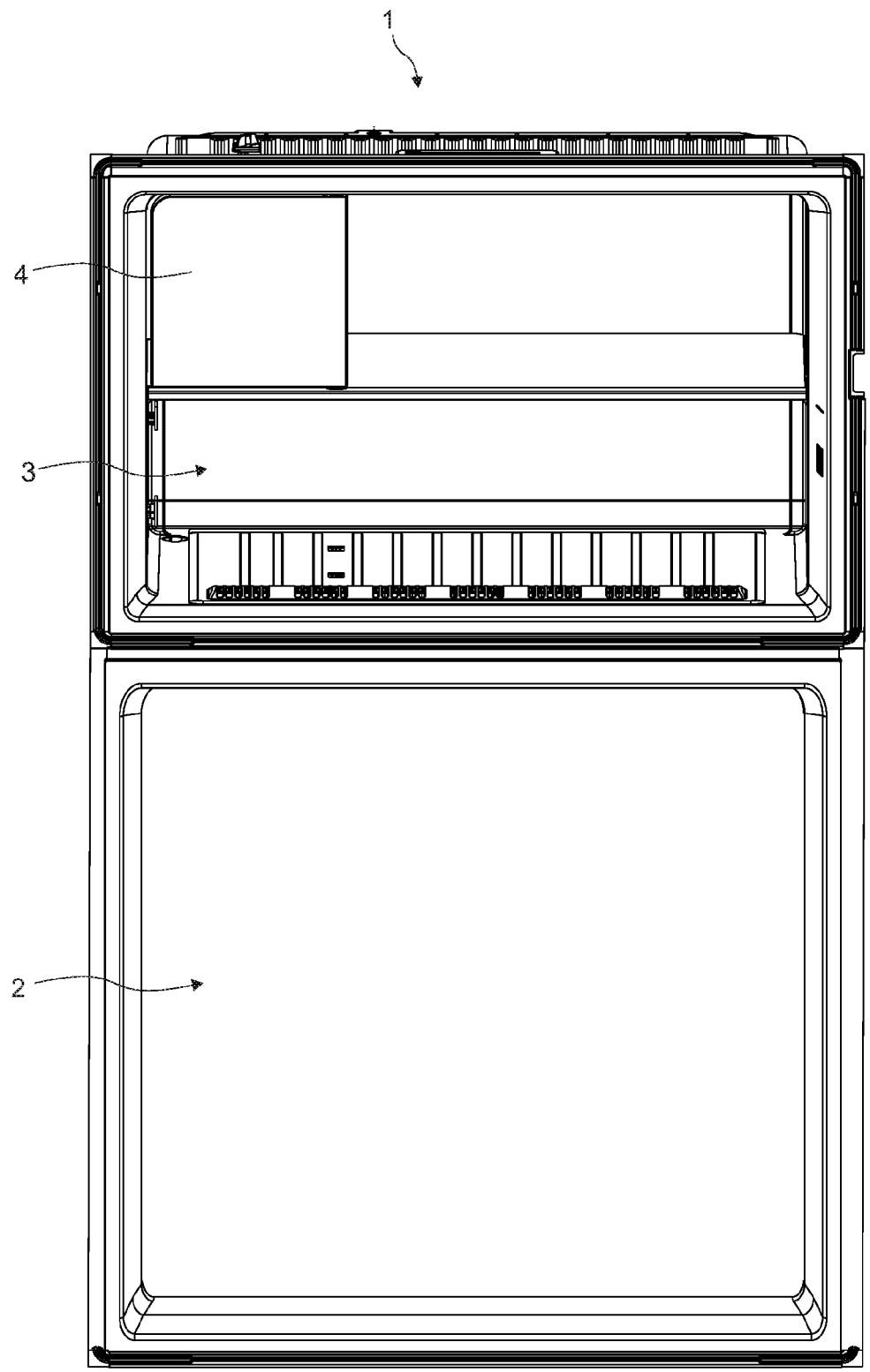

FIG. 8—is the front schematic view of a refrigerator wherein the ice cream making device is placed into the freezing compartment.

Figure 9:
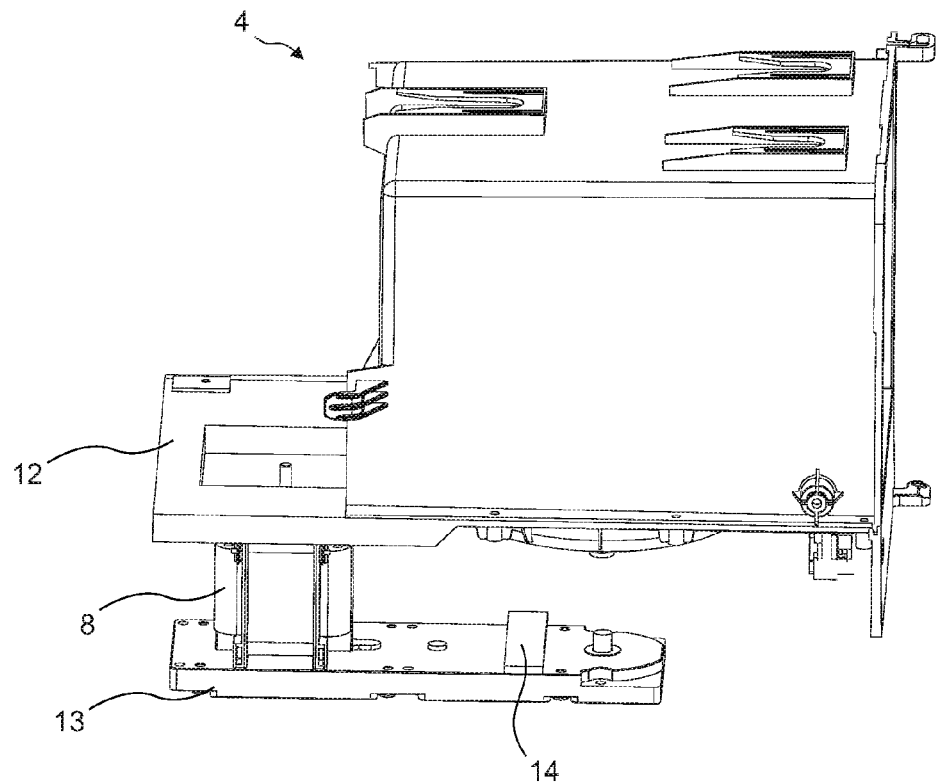

FIG. 9—is the sideways perspective view of the cabinet and the casing in another embodiment of the present invention.

Figure 10:
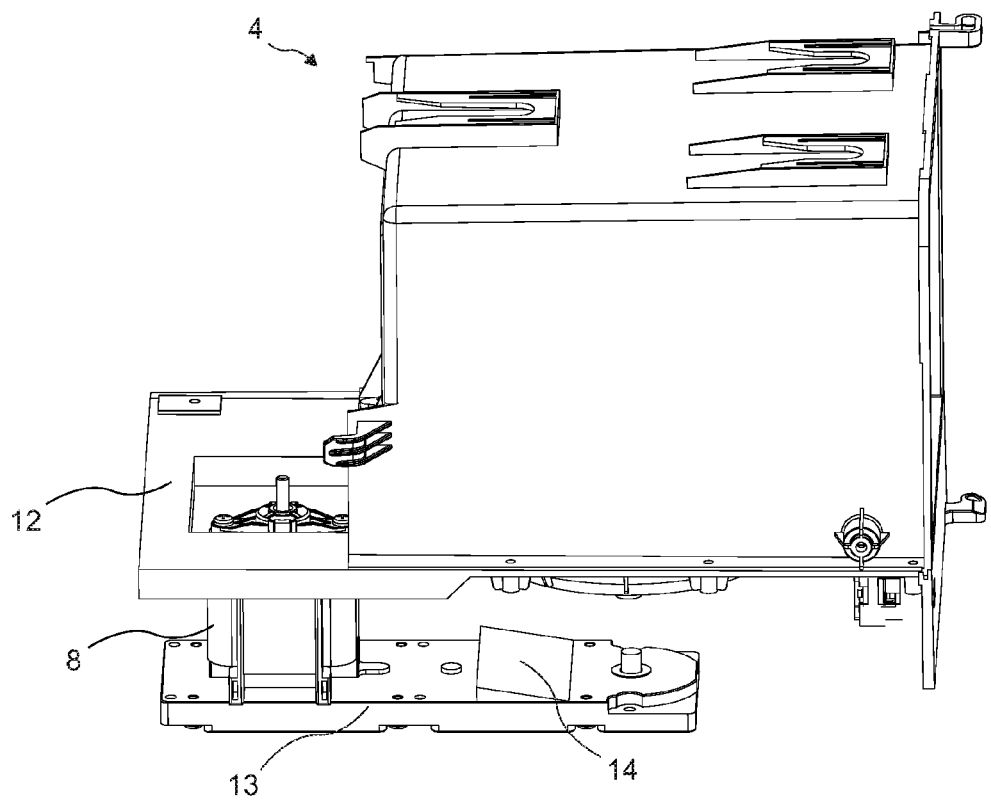

FIG. 10—is the sideways perspective view of the cabinet and the casing in another embodiment of the present invention.

Figure 11:
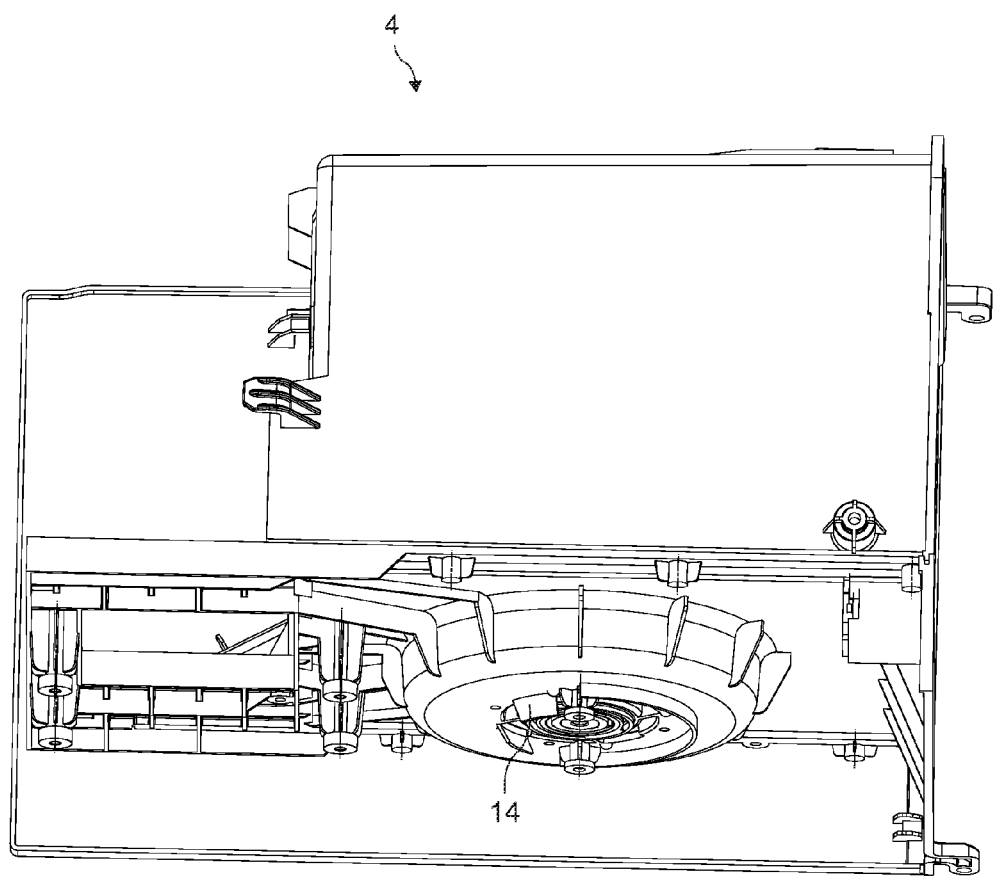

FIG. 11—is the perspective view of the cabinet in another embodiment of the present invention.

The elements illustrated in the figures are numbered as follows:
1. Refrigerator
2. Fresh food compartment
3. Freezing compartment
4. Ice cream making device
5. Cabinet
6. Receptacle
7. Mixer
8. Motor
9. Transmission means
10. Bottom wall
11. Housing 12. Extension
13. Casing
14. Sealing element
15. Assembly extension
16. Assembly housing The refrigerator (1) comprises a fresh food compartment (2) wherein foodstuffs to be cooled are placed, a freezing compartment (3) wherein foodstuffs to be frozen are placed, and an ice cream making device (4) which is placed into the freezing compartment (3).

The ice cream making device (4) comprises a cabinet (5), a receptacle (6) disposed inside the cabinet (5) and wherein ice cream is prepared, a mixer (7) situated in the receptacle (6), a motor (8) that actuates and rotates the mixer (7), and a transmission means (9) that transmits the movement of the motor (8) to the mixer (7). As illustrated in FIGS. 2 and 5, the transmission means (9) includes a transmission belt.

The ice cream making device (4) furthermore comprises
   a bottom wall (10) that forms the base of the cabinet (5),
   a housing (11) disposed on the bottom wall (10), whereon the receptacle (6) is mounted,
   an extension (12) that extends from the bottom wall (10) towards the outside of the cabinet (5) and that supports the motor (8),
   a casing (13) that is attached to the bottom wall (10) and that supports the motor (8) and the transmission means. (9), and
   a sealing element (14) that extends between the bottom wall (10) and the casing (13) in the vertical direction and that remains between the housing (11) and the motor (8) in the horizontal direction (FIG. 1, FIG. 2, FIG. 5, FIG. 6, FIG. 7, FIG. 8).

The casing (13) that carries the transmission means (9) is fixed to the cabinet (5) from below the extension (12) and the bottom wall (10). The transmission means (9) transmits the drive of the motor (8) to the mixer (7) from the underside of the cabinet (5) and through the housing (11).

In the ice cream making device (4) that is activated by a power switch disposed on the refrigerator (1), the mixer (7), disposed inside the receptacle (6) placed over the housing (11), is rotated by means of the motor (8) and the transmission means (9), enabling the ice cream ingredients inside the receptacle (6) to be mixed. The housing (11) is arranged at the bottom wall (10) of the cabinet (5) wherein the receptacle (6) is placed. When the receptacle (6) is seated into the housing (11), the mixer (7) extending through the housing (11) is connected to the transmission means (9). The user can take the receptacle (6) out of the cabinet (5) or place the receptacle (6) into the cabinet (5) by holding from a handle on the receptacle (6).

In the embodiment of the present invention, in case the user accidentally spills liquids into the housing (11) or the ingredients overflow from the receptacle (6) into the housing (11) during the making of ice cream in the receptacle (6), the sealing element (14) that serves as a barrier preventing the said liquid from reaching the motor (8) is situated between the bottom wall (10) and the casing (13). Thus, liquids spilling into the housing (11) cannot reach the motor (8) and a probable motor (8) malfunction is prevented.

In an embodiment of the present invention, the refrigerator (1) comprises the sealing element (14) that extends outwards from over the casing (13) transversely along the width of the casing (13) so as to face the motor (8). In case any liquid spills from inside the housing (11) onto the casing (13), the liquid is stopped by the sealing element (14) and prevented from reaching the motor (8).

In an embodiment of the present invention, the sealing element (14) comprises an assembly extension (15) that extends upwards from the upper surface of the casing (13) and an assembly housing (16) that is arranged on the bottom wall (10) and wherein the assembly extension (15) is seated (FIG. 3, FIG. 4). When the casing (13) is placed into the cabinet (5), the assembly extension (15) extending from over the casing (13) is seated into the assembly housing (16). Thus, a barrier is formed between the housing (11) and the motor (8), moreover centering is maintained for the installation of the casing (13) and the motor (8) to the cabinet (5).

In an embodiment of the present invention, the refrigerator (1) comprises the plate-shaped sealing element (14) that is situated on the bottom wall (10) under the housing (11) and that extends downwards from the housing (11) (FIG. 11). In case any liquid spills through the openings under the housing (11), the liquid is prevented from reaching the motor (8) by means of the sealing elements (14) and enabled to move in the opposite direction by means of the sealing elements (14) around the edges of the openings.

In an embodiment of the present invention, the refrigerator (1) comprises the sealing element (14) that is situated on the casing (13), that extends upwards from the casing (13) and that contacts the bottom wall (10) when the casing (13) and the cabinet (5) are mounted (FIG. 9).

In an embodiment of the present invention, the refrigerator (1) comprises the sealing element (14) that is situated on the casing (13), that extends upwards from the casing (13), that contacts the bottom wall (10) when the casing (13) and the cabinet (5) are mounted and of which the side close to the motor (8) is higher than the side close to the housing (11) (FIG. 10). The sealing element (14) has an inclined configuration and in case any liquid spills onto the casing (13) in large amounts and at high speeds, prevents the liquid from reaching the motor (8).

In an embodiment of the present invention, the sealing element (14) has a spongy structure with liquid absorbing properties. The sealing element (14) prevents the liquid from reaching the motor (8) and moreover at least partially sucks the liquid.

By means of the present invention, a refrigerator (1) is realized, comprising an easy- and safe-to-use and maintenance-friendly ice cream making device (4), having a cabinet (5) that enables ice cream to be made by placing the receptacle (6) therein and that is used as a storing compartment wherein the foodstuffs can be stored by taking out the receptacle (6) therefrom, wherein the mixer (7), the motor (8) and the transmission means (9) used for making ice cream can be mounted to/dismounted from the freezing compartment (3) together with the cabinet (5), wherein any probable motor (8) malfunction is prevented.

The invention claimed is:

1. A refrigerator (1) comprising
   a fresh food compartment (2) wherein foodstuffs to be cooled are placed,
   a freezing compartment (3) wherein foodstuffs to be frozen are placed and
   an ice cream making device (4) having a cabinet (5) that is placed into the freezing compartment (3), a receptacle (6) disposed inside the cabinet (5) and wherein ice cream is prepared, a mixer (7) situated in the receptacle (6), a motor (8) that actuates and rotates the mixer (7), and a transmission means (9) that transmits the movement of the motor (8) to the mixer (7),
   a bottom wall (10) that forms the base of the cabinet (5),
   a housing (11) disposed on the bottom wall (10), whereon the receptacle (6) is mounted, an extension (12) that extends from the bottom wall (10) towards the outside of the cabinet (5) and that supports the motor (8) and a casing (13) that is attached to the bottom wall (10) and that supports the motor (8) and the transmission means (9), characterized by a sealing element (14) that extends between the bottom wall (10) and the casing (13) and that remains between the housing (11) and the motor (8).

2. A refrigerator (1) as in claim 1, characterized by the sealing element (14) that extends outwards from over the casing (13) along the width of the casing (13) so as to face the motor (8).

3. A refrigerator (1) as in claim 2, characterized by an assembly extension (15) that extends upwards from the upper surface of the casing (13) and an assembly housing (16) that is arranged on the bottom wall (10) and wherein the assembly extension (15) is seated.

4. A refrigerator (1) as in claim 3, characterized by the sealing element (14) that has a spongy structure with liquid absorbing properties.

5. A refrigerator (1) as in claim 2, characterized by the plate-shaped sealing element (14) that is situated on the bottom wall (10) under the housing (11) and that extends downwards from the housing (11).

6. A refrigerator (1) as in claim 5, characterized by the sealing element (14) that has a spongy structure with liquid absorbing properties.

7. A refrigerator (1) as in claim 2, characterized by the sealing element (14) that is situated on the casing (13), that extends upwards from the casing (13) and that contacts the bottom wall (10) when the casing (13) and the cabinet (5) are mounted.

8. A refrigerator (1) as in claim 7, characterized by the sealing element (14) that has a spongy structure with liquid absorbing properties.

9. A refrigerator (1) as in claim 2, characterized by the sealing element (14) that is situated on the casing (13), that extends upwards from the casing (13), that contacts the bottom wall (10) when the casing (13) and the cabinet (5) are mounted and of which the side close the motor (8) is higher than the side close to the housing (11).

10. A refrigerator (1) as in claim 9, characterized by the sealing element (14) that has a spongy structure with liquid absorbing properties.

11. A refrigerator (1) as in claim 2, characterized by the sealing element (14) that has a spongy structure with liquid absorbing properties.

12. A refrigerator (1) as in claim 1, characterized by an assembly extension (15) that extends upwards from the upper surface of the casing (13) and an assembly housing (16) that is arranged on the bottom wall (10) and wherein the assembly extension (15) is seated.

13. A refrigerator (1) as in claim 12, characterized by the sealing element (14) that has a spongy structure with liquid absorbing properties.

14. A refrigerator (1) as in claim 1, characterized by the plate-shaped sealing element (14) that is situated on the bottom wall (10) under the housing (11) and that extends downwards from the housing (11).

15. A refrigerator (1) as in claim 14, characterized by the sealing element (14) that has a spongy structure with liquid absorbing properties.

16. A refrigerator (1) as in claim 1, characterized by the sealing element (14) that is situated on the casing (13), that extends upwards from the casing (13) and that contacts the bottom wall (10) when the casing (13) and the cabinet (5) are mounted.

17. A refrigerator (1) as in claim 16, characterized by the sealing element (14) that has a spongy structure with liquid absorbing properties.

18. A refrigerator (1) as in claim 1, characterized by the sealing element (14) that is situated on the casing (13), that extends upwards from the casing (13), that contacts the bottom wall (10) when the casing (13) and the cabinet (5) are mounted and of which the side close the motor (8) is higher than the side close to the housing (11).

19. A refrigerator (1) as in claim 18, characterized by the sealing element (14) that has a spongy structure with liquid absorbing properties.

20. A refrigerator (1) as in claim 1, characterized by the sealing element (14) that has a spongy structure with liquid absorbing properties.

* * * * *